Jan. 5, 1971 G. Y. BENZIES 3,552,835
RETAINING STRIP AND CHANNEL FOR STRETCHED REFLECTOR
Filed Feb. 18, 1969
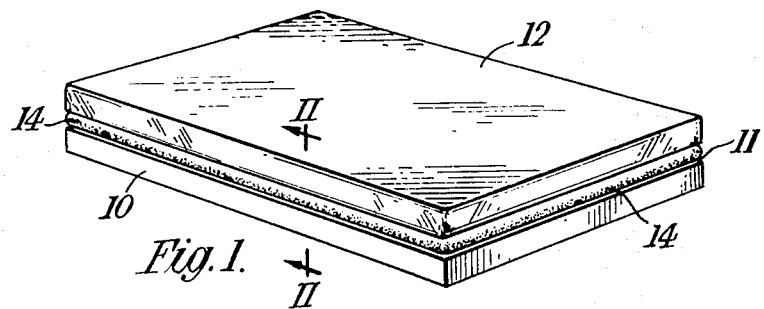
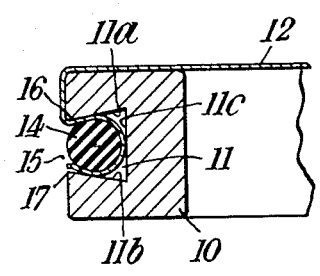
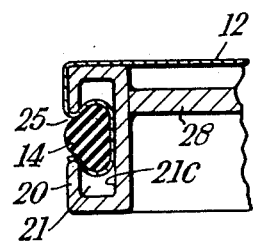
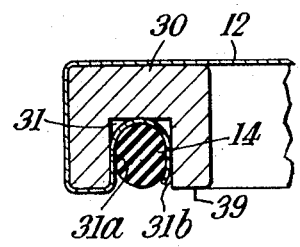
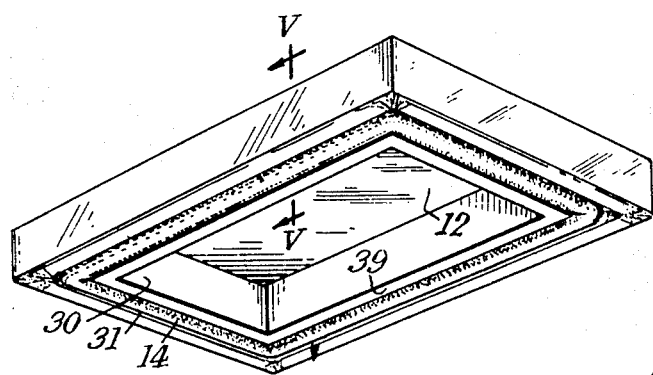
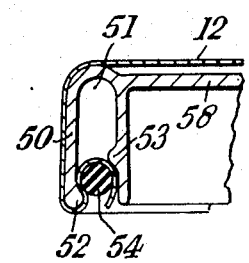
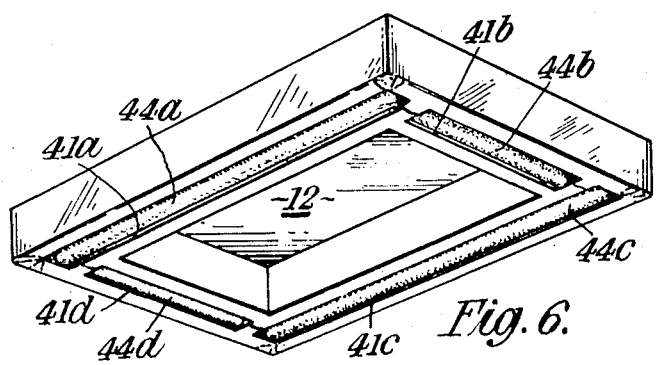
Inventor
George Young Benzies
By Cushman, Darby & Cushman
Attorneys

United States Patent Office 3,552,835
Patented Jan. 5, 1971

3,552,835
RETAINING STRIP AND CHANNEL FOR STRETCHED REFLECTOR
George Y. Benzies, Woking, England, assignor to British Aircraft Corporation Limited (formerly British Aircraft Corporation (Operating) Limited), London, England, a British company
Filed Feb. 18, 1969, Ser. No. 800,141
Claims priority, application Great Britain, Feb. 22, 1968, 8,711/68
Int. Cl. G02l 5/08
U.S. Cl. 350—288                                 8 Claims

ABSTRACT OF THE DISCLOSURE

Mirrors having reflecting surfaces of metallised flexible plastic film are disclosed, in which the film is secured to a rigid backing member by having its peripheral portion trapped in a channel extending around the backing member by means of a deformable strip of resilient material which is forced into the channel and held there under compression.

---

This invention relates to mirrors and more specifically to lightweight mirrors of the type in which the reflecting surface is formed by a sheet of metallised flexible plastic film stretcher over a peripheral edge of a rigid backing member, e.g. a frame or plate. The peripheral portion of the reflecting sheet has hitherto usually been attached to the rear of the backing member by means of an adhesive, but this is a time-consuming process and many of the faster-setting adhesives allow a certain amount of yielding to take place, which may destroy the evenness of the tension in the sheet and cause irregularities in the reflecting surface.

According to the present invention, in a mirror of the type defined above, a peripheral portion of the reflecting sheet is secured in a channel extending around the backing member by means of a deformable strip of resilient material which is held in the channel under compression. Preferably the channel narrows towards its mouth, the width of its mouth being less than the uncompressed width of the strip. Thus the channel may be of dove-tail section and the deformable strip may be of circular section, the diameter of the strip being greater than the width of the mouth of the channel and greater than its depth, but less than the width of its base. When the peripheral portion of the reflecting sheet is stretched across the mouth of the dove-tail section channel and the strip is pressed into it, the strip carries the peripheral portion of the sheet into the channel and grips it against the two walls and base of the channel.

Also according to the invention, a method of making a mirror, whose reflecting surface is formed by a sheet of metallised flexible plastic film, comprises stretching the sheet over a peripheral edge of a rigid backing member and securing a peripheral portion of the reflecting sheet in a channel extending around the backing member by forcing a deformable strip of resilient material into the channel over the peripheral portion of the sheet so that the strip is held in the channel under compression and thereby grips the peripheral portion of the sheet against one or more of the walls of the channel.

The channel may be a groove cut in the rear or side face of a backing plate or it may be formed in the side or rear face of a drawn or extruded edge strip, which may be attached to a frame or plate to constitute the backing member.

The edge of the mouth of the channel nearest to the reflecting surface is preferably radiused to eliminate any sharp edges which might cut the film, but the other edge of the mouth is preferably left sharp so as to facilitate the cutting away of any excess of film.

The channel may be continuous all round the backing member, in which case the deformable strip may either be a continuous length of O-ring material or may be made up of several lengths of similar strip material whose ends are adjacent one another. In other cases, the channel may be interrupted, e.g. at the corners of a rectangular mirror, each section of the channel receiving a separate section of the deformable strip.

Specific embodiments of the invention will now be described in more detail by way of example and with reference to the accompanying drawing, in which:

FIG. 1 is a perspective view of a mirror,

FIG. 2 is a partial sectional view to a larger scale one the line II—II of FIG. 1, FIG. 3 is a sectional view similar to FIG. 2 through a mirror using an alternative kind of backing member, FIG. 4 is a perspective view from below of another mirror.

FIG. 5 is a sectional view similar to FIGS. 2 and 3 but taken on the line V—V of FIG. 4, FIG. 6 is a perspective view, similar to FIG. 4, of a further mirror, and FIG. 7 is a sectional view similar to FIGS. 2, 3 and 5 through yet another mirror.

In the embodiment shown in FIGS. 1 and 2, the backing member consists of a rectangular metal frame 10 having a channel 11 in the form of a dove-tail section groove cut in its side faces so as to extend around the whole of its periphery. The reflecting surface is formed by a sheet 12 of metallised flexible plastic film, e.g. that sold under the trademark Vapcolex, which is stretched over the peripheral edge of the frame 10. The peripheral portion of the sheet 12 is secured in the channel 11 by means of a continuous O-ring 14 of a deformable resilient rubber or plastics material. The circumferential length of the ring 14 in the relaxed state is slightly less than the total length of the channel 11. In this example the material of the ring is of circular section, of such diameter that when the ring is forced into the channel 11 through the narrow mouth 15 it is held therein under compression and grips the peripheral portion of the sheet 12 against the upper and lower walls 11a, 11b and the base 11c of the channel. For this purpose, the diameter of the material of the ring 14 in the uncompressed state should be greater than the width of the mouth 15 of the channel and greater than its depth but should preferably be less than the width of the base 11c of the channel.

The channel 11 may be interrupted at certain points around the periphery of the frame 10, e.g. at the corners. In this case, or with a continuous channel 11, the O-ring 14 may be replaced by a number of separate strips of similar material. The upper lip 16 of the mouth 15 of the channel may be radiused to avoid the risk of cutting the sheet 12, while the lower lip 17 may be left sharp to assist in cutting off any excess sheet material.

Instead of using a frame 10 with a channel 11 machined in it, one may use a frame 20 in the form of an extruded or drawn section incorporating a channel 21, as shown in FIG. 3. In this embodiment, the channel 21 is substantially rectangular in section with its mouth 25 intermediate the ends of one of the longer sides of the rectangular section. This kind of extruded or drawn section can be given a gentle curvature, e.g. for making circular or elliptical mirrors.

The ring 14 is again of circular section in the uncompressed state. It grips the peripheral portion of the sheet 12 against the lips of the mouth 25 of the channel 21 and against its rear wall 21c. A plate 28 may be secured to the inside of the frame 20, extending across the mirror below the reflecting sheet 12, to give additional rigidity to the backing member.

FIG. 4 shows a mirror similar to that of FIGS. 1 and 2 except that the channel 31 is machined in the rear or under face 39 of the frame 30. Also, as shown in FIG. 5, the channel 31 may be of rectangular instead of dove-tail section provided that the dimensions are such that the ring 14 is sufficiently tightly compressed to be held in place by friction. It grips the peripheral portion of the sheet 12 against the side walls 31a, 31b of the channel.

FIG. 6 shows a mirror similar to that of FIG. 4 except that the channel 41 is in four separate sections 41a, 41b, 41c, and 41d, each of which contains a separate strip 44a, 44b, 44c and 44d respectively, of resilient O-ring material similar to the material of the rings 14 of the embodiments described above. The four strips hold the peripheral portion of the sheet 12 in the sections of the channel as before.

FIG. 7 illustrates the use of a frame 50 which may be moulded in one with a backing plate 58 or may be an extruded or drawn section. A channel 51 faces to the rear of the mirror and accommodates a deformable resilient ring 54. The frame 50 is of inverted U-section with inward protrusions 52, 53 staggered vertically. The frame has a certain resilience which, in conjunction with the resilience of the ring 54, enables the latter to be forced into the channel 51 between the protrusions 52, 53, carrying the peripheral portion of the sheet 12 with it. In the uncompressed state, the ring 54 is of circular section, though square-section or semi-circular section rings may also be employed. It holds the peripheral portion of the reflecting sheet 12 in the channel 51 in the same manner as before.

The channel may take other forms than those illustrated, such as a part-circular cross-section, so long as it is capable of receiving and holding the resilient deformable strip with a tight engagement between the strip and the walls of the channel. The cross-section of the resilient strip may be of various shapes and may be either solid or hollow (tubular).

The invention enables the reflecting sheet to be quickly and reliably anchored to the backing member while eliminating the need for adhesives.

I claim:

1. A planar mirror whose planar reflecting surface is formed by a sheet of metallised flexible plastic film stretched over a peripheral edge of a rigid backing member, wherein a peripheral portion of the reflecting sheet is forced into and secured within a channel extending around the backing member by means of a deformable strip of resilient material which is held in the channel under compression, the width of the channel being less than the uncompressed width of the strip.

2. A mirror according to claim 1, wherein the channel narrows towards its mouth.

3. A mirror according to claim 2, wherein the channel is of dove-tail section.

4. A mirror according to claim 1, wherein the channel is of substantially rectangular section and has its mouth intermediate the ends of one of the longer sides of the rectangular section.

5. A mirror according to claim 1, wherein the channel is disposed in a side face of the backing member.

6. A mirror according to claim 1 wherein the channel is disposed in a rear face of the backing member.

7. A mirror according to claim 1 wherein the channel extends continuously all round the backing member.

8. A mirror according to claim 1 wherein the channel is interrupted at the corners of a rectangular mirror, and a separate section of the deformable strip is disposed in each section of the channel.

References Cited
UNITED STATES PATENTS

| | | | |
|---|---|---|---|
| 2,182,585 | 12/1939 | Green | 350—318 |
| 2,952,189 | 9/1960 | Pajes | 350—295 |
| 3,031,928 | 5/1962 | Kopito | 350—180X |

DAVID SCHONBERG, Primary Examiner

J. W. LEONARD, Assistant Examiner

U.S. Cl. X.R.

350—310, 318